United States Patent Office 2,716,665
Patented Aug. 30, 1955

2,716,665

MANUFACTURE OF UNSATURATED ALDEHYDES

David James Hadley, Epsom Downs, and Charles Albin Woodcock, Beckenham, England, assignors to The Distillers Company Limited, Edinburgh, Scotland, a British company No Drawing. Application July 27, 1951,
Serial No. 239,002

Claims priority, application Great Britain August 25, 1950

8 Claims. (Cl. 260—604)

The present invention relates to an improved process for the manufacture of unsaturated aldehydes by the oxidation of olefines using copper silicate in conjunction with elementary selenium as catalyst.

Processes for the manufacture of such aldehydes by the oxidation of olefines using copper silicate and selenium as catalyst have already been described in the copending application No. 150,108, filed March 16, 1950, by David James Hadley and Robert James Nichol, now Patent No. 2,670,379.

The present invention is concerned with the same oxidation process using a solid contact material comprising copper silicate and silica, whereby substantially improved results are obtained.

According to the invention the process for the manufacture of unsaturated aldehydes comprises reacting an olefine of the general formula $R-C(CH_3)=CHR_1$, hereinafter defined, in the vapour phase with molecular oxygen at elevated temperatures in the presence in the reaction zone of elementary selenium and a solid contact material comprising cupric silicate and silica, in which the molar ratio of copper to silica ($SiO_2$) is between 1:2 and 1:12.

In the above mentioned general formula defining the olefines R and $R_1$ are hydrogen atoms or saturated straight or branched chain alkyl groups. Examples of suitable olefines are propylene, isobutene, 2-methylbut-2-ene, 2:4:-trimethylbut-2-ene, 2:4:4-trimethylpent-2-ene, codimers of n-butene and isobutene and 2-methylpent-1-ene.

Pure oxygen may be used in the process according to the invention, or air, or other free oxygen-containing mixtures. The gas composition is preferably arranged so that the oxygen content is below that which is necessary to render the mixture inflammable. In the case of propylene mixed with oxygen and nitrogen this oxygen limit is about 11% v./v. at room temperature and 8% v./v. at 320° C. and provided the oxygen content is below this limit there is no danger of explosion whatever the concentration of the olefine. Inflammable impurities such as propane and butane may be tolerated especially those hydrocarbons and inert olefines which do not affect the oxygen explosion limit. Hitherto the process could not be worked economically with oxygen concentrations of this order, particularly in the oxidation of propylene to acrolein, because of the low yields obtained. Using the process of the present invention economically satisfactory yields of acrolein can still be obtained with these relatively low oxygen concentrations.

Suitable reaction temperatures lie within the range of 200 to 400° C., the most suitable being between 250 and 350° C.

Elementary selenium, for instance as a powder, may be mixed with the other components of the catalyst before it is placed in the reactor or preferably selenium vapour may be added to the mixture of the reacting gases.

The solid contact material comprising cupric silicate and silica in which the molar ratio of copper to silica ($SiO_2$) is between 1:2 and 1:12 may be prepared for instance in the following manner: Copper silicate is precipitated from dilute aqueous solutions of equimolecular quantities of a water-soluble cupric salt such as copper chloride, copper sulphate and, preferably, copper nitrate, and sodium meta-silicate and the resulting mixture or suspension of copper silicate added to an aqueous suspension of silicic acid formed by adding acid to a solution of sodium meta-silicate, the proportions being chosen so that the resulting product contains between 2 and 12 moles of silica to each mole of copper.

The ratio of silica to copper is kept as high as possible for economic reasons and also because during prolonged use under reaction conditions it has been found that there is a tendency for the contact material to form crystalline compounds on the surface of the granules whereby the interstices between the grains become blocked. This blocking results in an increased resistance to the passage of the mixture of the gaseous reactants. This tendency for the formation of crystalline compounds is less with high than with low silica to copper ratios. The preferred ratio of silica to copper is about 9:1.

The mixed precipitate may be filtered off and dried without washing. However, a more active catalyts is produced when the filtered precipitate before it is dried is washed with water until it is free from the sodium salts which are dissolved in the water retained initially by the filtered precipitate. This increase in the activity, however, is apparently not due only to the removal of the sodium salts since a subsequent impregnation of the washed precipitate with a salt solution does not always restore the previously obtained activity of the contact material. A further degree of activity intermediate between that of the unwashed material and that which has been washed before drying is obtained by washing after drying when the material is in the form of granules or pellets. A method of reducing the activity which can be applied generally is to heat to a high temperature for instance 600°–1,000° C.

It should be noted that the most active catalyst is not the most suitable for use in the oxidation of all the olefines coming within the general formula set forth above. For instance, in the case of isobutene, the use of the most active catalyst results in too great a conversion to carbon dioxide and the liberation of excessive heat, which may be difficult to disperse on the large scale.

While the catalyst may, if desired, be further distributed on a carrier this is not necessary owing to the presence of the silica. The copper silicate-silica mixture is conveniently used in the form of pellets.

The process of the present invention may be carried out in a single pass system in which all the gas leaving the reactor is vented and treated for the recovery of the desired aldehyde for instance by scrubbing with a solvent or by cooling. Alternatively, it may be conducted in a recycle system. As used herein, the expressions "percent v./v." signifies percent by volume and "percent w./w.," percent by weight.

The following examples illustrate methods of carrying out the process according to the present invention.

Example 1

200 grm. of commercial sodium metasilicate, containing about 50% w./w. $Na_2SiO_3$ was dissolved in 2 litres of cold, distilled water. This solution was stirred while there was added to it sufficient dilute hydrochloric acid, made from 1 volume concentrated hydrochloric acid and 4 volumes water, to render it acid to methyl red. A gel rapidly formed.

In another vessel 25 grams sodium metasilicate was dissolved in 1 litre water and to this was added a solution of 25 grams copper nitrate $(Cu(NO_3)_2.3H_2O)$ in 250 cc. water, to precipitate cupric silicate.

The suspension of copper silicate was poured into the suspension of silica and the whole vigorously stirred. The mixed precipitate was then filtered off under suction and as much liquid as possible was removed but the filter cake was not washed. After being dried at 100° C. the product was heated in a stream of air for 1½ hours at 320° C. and contained approximately 9 moles of $SiO_2$ for each mole of Cu. It was then ground to pass an 18 mesh British Standard Testing sieve and formed into ⅛ inch diameter pellets. The pellets were heated at 600° C. for 1½ hours.

8 grams of these pellets were placed in a 6 mm. bore, helical reactor of Pyrex (registered trademark) glass which was heated to 320° C. A mixture of 2% v./v. isobutene in air was passed at the rate of 25 litre/hour over a selenium reservoir, also at 320° C. from which 0.025 gram/hour of selenium was evaporated and then through the reactor. Methacrolein was washed out of the exit gases with cold water. 63% of the isobutene fed was converted to methacrolein and 19% to $CO_2$. During a run of over 1,000 hours these results were substantially maintained and there was no appreciable increase in back-pressure over the catalyst bed.

For comparisons sake this test was repeated under similar conditions, except that the copper silicate/silicon mixture was washed after filtration and was heated to about but not above 320° C. In this case 48% of the isobutene fed was converted to methacrolein and 35% to $CO_2$. Furthermore, by adjusting the silicate solution and the copper salt solution in such a way that the ultimate precipitate contains copper and silica in a molar ratio of approximately 1.0 $SiO_2$ to not more than 1.2 Cu but following in other respects the method described, pelleting the product after having heated it for 1½ hours to 600° C. and using 16 grm. of the pellets for the oxidation of isobutene under identical conditions, 57% of the isobutene fed was converted into methacrolein and 12% to $CO_2$ but the back-pressure across the catalyst, initially only about 8 mm. Hg, rose to several centimetres after 700 hours. A further comparative test was carried out by using a catalyst which contained only half the quantity of copper silicate to that indicated in the first two paragraphs above. It was tested in the described method when 8% of the isobutene fed was converted to methacrolein and 5% to $CO_2$.

*Example 2*

The treatment described in the first four paragraphs of Example 1 was repeated with 16 grm. catalyst and a gas feed consisting of 2% v./v. isobutene, 48% v./v. air and 50% v./v. nitrogen was used. 63% of the isobutene fed was converted to methacrolein and 20% to $CO_2$.

*Example 3*

A catalyst was made as described in the first three paragraphs of Example 1, but washed after filtration and not heated above 320° C. 16 grm. of this was tested in the reactor described in Example 1 at 320° C. A feed of 25 l./hr. of 2% propylene in air, to which was added 0.025 grm. selenium per hour, was used. 70% of the propylene fed was converted to acrolein and 17% to $CO_2$. A similar result was obtained when half the air fed to the reactor was replaced by nitrogen.

*Example 4*

A catalyst was made according to the method described in the first three paragraphs of Example 1 but was not heated above 320° C. It was tested under the conditions given in Example 3. 47% of the propylene fed was converted to acrolein and 9% to $CO_2$.

*Example 5*

The experiment described in the first four paragraphs of Example 1 was repeated with a mixture of butene-1 and butene-2, in approximately equal proportions, substituted for isobutene. 13% of the mixed n-butenes fed was converted to crotonaldehyde and 13% to $CO_2$.

By replacing the olefines exemplified in the above examples by other olefines of the general formula mentioned and enumerated above the oxidation proceeded in a similar way and the corresponding unsaturated aldehydes were obtained.

We claim:

1. Process for the manufacture of unsaturated aldehydes by the catalytical oxidation of olefines of the general formula $R-C(CH_3)=CHR_1$ wherein R and $R_1$ represent substituents selected from the group consisting of hydrogen, a saturated straight chain alkyl group and a saturated branched chain alkyl group which comprises reacting the olefine in the vapour phase at a temperature of about 200–400° C. with molecular oxygen in the presence in the reaction zone of elementary selenium and a solid contact material which has been produced by precipitating cupric silicate by the addition of an aqueous alkali metal metasilicate solution to an aqueous cupric salt solution in equimolecular proportions and mixing the resulting precipitate with an aqueous suspension of silicic acid in a ratio of 2:12 moles of silica to one mole of copper.

2. Process according to claim 1, wherein the contact reaction is effected between 280° and 350° C.

3. Process according to claim 1, wherein the elementary selenium in the reaction zone is provided by the admixture of selenium vapour with the mixture of the reactant gases.

4. Process according to claim 1, wherein the mixed precipitate of cupric silicate and silicic acid is dried after having been washed with water for the removal of water soluble salts whereby a catalyst of enhanced activity is obtained.

5. Process according to claim 1, wherein the mixed precipitate is dried without having been washed previously whereby a catalyst of modified activity results.

6. Process according to claim 1, wherein the mixed precipitate is dried and the dried mixture is subjected to a washing process.

7. Process according to claim 1, wherein the copper silicate silica mixture is subsequently heated at a temperature between 600° and 1000° C.

8. Process for the manufacture of methacrolein by the catalytical oxidation of isobutene which comprises reacting the olefine in the vapour phase at a temperature of about 200–400° C. with molecular oxygen in the presence in the reaction zone of elementary selenium and a solid contact material comprising cupric silicate and silica in which the molar ratio of copper to silica is between 2:1 and 1:12.

References Cited in the file of this patent

UNITED STATES PATENTS

| | | |
|---|---|---|
| 2,161,066 | La Lande, Jr | June 6, 1939 |
| 2,280,650 | Kassel | Apr. 21, 1942 |
| 2,383,711 | Clark et al. | Aug. 28, 1945 |
| 2,451,485 | Hearne et al. | Oct. 19, 1948 |
| 2,523,686 | Engel | Sept. 26, 1950 |
| 2,593,437 | Goodings et al. | Apr. 22, 1952 |

FOREIGN PATENTS

| | | |
|---|---|---|
| 625,330 | Great Britain | June 27, 1949 |
| 494,717 | Belgium | Apr. 15, 1950 |
| 648,386 | Great Britain | Jan. 3, 1951 |